(12) United States Patent
Höfflinger et al.

(10) Patent No.: US 7,420,599 B2
(45) Date of Patent: Sep. 2, 2008

(54) METHOD AND DEVICE FOR THE FPN CORRECTION OF IMAGE SIGNALS

(75) Inventors: Bernd Höfflinger, Sindelfingen (DE); Cornelis Scherjon, Gerlingen (DE)

(73) Assignee: Institut für Mikroelektronik Stuttgart, Stuttgart (DE)

( * ) Notice: Subject to any disclaimer, the term of this patent is extended or adjusted under 35 U.S.C. 154(b) by 640 days.

(21) Appl. No.: 10/674,784

(22) Filed: Sep. 30, 2003

(65) Prior Publication Data
US 2004/0100568 A1    May 27, 2004

Related U.S. Application Data

(63) Continuation of application No. PCT/EP02/03356, filed on Mar. 26, 2002.

(30) Foreign Application Priority Data
Apr. 3, 2001    (DE) ................. 101 17 833

(51) Int. Cl.
    *H04N 5/217* (2006.01)
    *H04N 5/20* (2006.01)
(52) U.S. Cl. .................. 348/241; 348/255
(58) Field of Classification Search ........ 348/241, 348/343, 246, 247, 255, 243
    See application file for complete search history.

(56) References Cited

U.S. PATENT DOCUMENTS

| 5,289,286 | A |   | 2/1994  | Nakamura et al. |
| 5,969,758 | A | * | 10/1999 | Sauer et al. ............... 348/241 |
| 6,191,408 | B1 | * | 2/2001  | Shinotsuka et al. ....... 250/208.1 |
| 6,320,616 | B1 | * | 11/2001 | Sauer ....................... 348/241 |
| 6,762,398 | B1 | * | 7/2004  | Tanaka ................... 250/208.1 |
| 6,798,452 | B1 | * | 9/2004  | Kuroda et al. .............. 348/301 |
| 6,831,686 | B1 | * | 12/2004 | Koren et al. ............... 348/243 |

FOREIGN PATENT DOCUMENTS

| DE | 43 05 251 C1 | 5/1994 |
| EP | 0 632 930 B1 | 3/1993 |

(Continued)

OTHER PUBLICATIONS

XP-000934312; J.E.D. Hurwitz, Peter B. Denyer, Donald J. Baster, Graham Townsend; "An 800K-Pixel Color CMOS Sensor For Consumer Still Cameras"; SPIE vol. 3019; Nov. 1997; pp. 115-124.

(Continued)

*Primary Examiner*—James M. Hannett
*Assistant Examiner*—Kelly Jerabek
(74) *Attorney, Agent, or Firm*—Harness, Dickey & Pierce, P.L.C.

(57) ABSTRACT

A device for the FPN correction of image signals which are generated by image cells of an image sensor comprises a discriminator for determining in which value range out of at least two value ranges a value of an image signal of an image cell is located at a predetermined instant of time. The result determined by the discriminator is feed to a correction device. The correction device selects correction coefficients from a plurality of sets of correction coefficients as a function of the result determined by the discriminator, and a transformation unit calculates the corrected value for the image signal by using the selected correction coefficients.

23 Claims, 8 Drawing Sheets

FOREIGN PATENT DOCUMENTS

| | | |
|---|---|---|
| GB | 2 149 605 A | 6/1985 |
| JP | 61-144174 | 7/1986 |
| JP | 2-107074 | 4/1990 |
| JP | 2 107074 | 4/1990 |
| JP | 2-215286 | 8/1990 |
| JP | 4-355576 | 12/1992 |
| JP | 5 137073 | 6/1993 |
| JP | 5-167848 | 7/1993 |
| JP | 6-350930 | 12/1994 |
| JP | 9-65214 | 3/1997 |
| JP | 10-62305 | 3/1998 |
| JP | 11-298799 | 10/1999 |
| JP | 2000-138867 | 5/2000 |
| JP | 2000-175108 | 6/2000 |
| JP | 2000-244824 | 9/2000 |
| JP | 2001-94884 | 4/2001 |
| JP | 2001-245222 | 9/2001 |
| JP | 2002-118791 | 4/2002 |
| JP | 2002-262182 | 9/2002 |
| JP | 2002-314887 | 10/2002 |

OTHER PUBLICATIONS

XP-002204482; Spyros Kavadias, Bart Dierickx, Danny Scheffer, Andre Alaerts, Kirk Uwaerts, Jan Bogaerts; A Logarithmic Response CMOS Image Sensor with On-Chip Calibration; IEEE Journal Of Solid-State Circuits, vol. 35, No. 8; Aug. 2000; pp. 1146-1152.

* cited by examiner

METHOD AND DEVICE FOR THE FPN CORRECTION OF IMAGE SIGNALS

CROSS-REFERENCES TO RELATED APPLICATIONS

This application is a continuation of copending international patent application PCT/EP02/03356 published in German language, which application was filed on Mar. 26, 2002 designating the U.S. and which application claims priority from German patent application DE 101 17 833.6, filed on Apr. 3, 2001.

BACKGROUND OF THE INVENTION

The invention generally relates to electronic image sensors used in digital cameras, and more particularly to a method and a device for the FPN correction of image signals which are generated by image cells of such an image sensor. The invention further relates to a digital camera comprising such a device.

In photo and film camera technology, image sensors which convert an optical intensity distribution into electronic image signals are increasingly used as a replacement for conventional film material. Such image sensors comprise a regular arrangement of image elements (pixels) which in each case include one or more light-sensitive circuits of semiconductor components designated as image cell in the following. Each of these image cells generates an image signal, the voltage value of which is a function of the intensity of the light impinging on the image cell.

In the case of image sensors for colored reproduction, each image element generally consists of a triplet of image cells which are each covered by a color filter for one of the three spectral colors red, green and blue. Each image signal of such an image cell reproduces a brightness value related to the relevant spectral color so that the three individual signals as a whole provide the color information for the relevant image element.

If an image represented by such image signals is viewed on a monitor or on a printout, it is found that areas of the image which should actually have a homogeneous and uniform appearance comprise, in fact, more or less severe graininess. This graininess arises due to the fact that identically constructed image cells generate different image signals in spite of equal intensity of the impinging light. This effect is called "fixed pattern noise" or "FPN" for short. The different characteristics of the image cells, which should be identical, are attributable to production-related variations of the electronic components from which the individual image cells are constructed. In particular, these variations relate to the geometry and doping of the patterns making up the individual electronic components themselves. The more complex the structure of the individual image cells, the greater generally also the FPN.

To correct for the FPN, it is known to record an image having a reference brightness with the image sensor during a so-called "white balance" and to store for each image cell a difference value of the corresponding image signal with respect to a common reference signal. This difference value, which can be positive or negative, is then always added to the image signal generated by the relevant image cell. For the reference brightness, the FPN may completely be corrected by this known method.

For brightnesses differing from the reference brightness, however, the FPN is corrected only inadequately, i.e. the grainy representation of actually homogeneous areas remains largely unchanged with such brightnesses. The reason for this is that the characteristic curves of the individual image cells which specify the relationship between the optical intensity (brightness) impinging on the image cell and the image signal generated cannot be made to coincide by only adding a difference value. Instead, the characteristic curves of the individual image cells also differ with respect to their slope so that a correction at the reference brightness may have considerably less effect at other brightnesses.

In practice, correcting for the FPN encounters problems especially because elaborate mathematical transformations are not accepted, at least for commercial applications, because of the high memory and computing capacities required and because of real-time requirements.

SUMMARY OF THE INVENTION

It is, therefore, an object of the invention to improve a method and a device for the FPN correction of image signals of the type initially mentioned such that a considerable reduction of the FPN is achieved with little requirements for memory capacity and computing performance.

According to one aspect of the invention, this object is achieved by a method comprising the following steps which are preferably executed separately for the image signal of each image cell:

a) determining in which value range out of at least two value ranges a value of the image signal is located at a predetermined instant of time; and b) determining a corrected value for the image signal as a function of the result according to step a).

According to another aspect, the object is achieved by a device of the type initially mentioned, characterized by:

a) a discriminator for determining in which value range out of at least two value ranges a value of an image signal of an image cell is located at a predetermined instant of time, b) a selection device for determining a corrected value for the image signal as a function of the result determined by the discriminator.

The invention exploits the idea that a significant improvement in the FPN correction can be achieved by correcting the image signals not in a uniform manner over the entire range of values but differently in accordance with individual value ranges. This allows good correction results to be achieved with simple transformations with low requirements for memory capacity and computing performance. This is because, within the individual value ranges, the actual characteristic curve of each image cell can be approximated by a mathematically simple approximation characteristic which allows correspondingly simple transformations to be used and which can be performed with little computing effort. The basic transformation equations then only need a few coefficients as a result of which the required memory can be kept small.

Correcting the image signals individually for different value ranges makes it possible to approximate the relatively complicated characteristic curves of the individual image cells section by section using simple functions so that a good correction of the FPN is achieved with simple transformation equations and correspondingly few coefficients per image cell.

The corrected value for the image signal can be determined, for example, such that a number of corrected values corresponding to the number of value ranges is determined for each image element by using the transformation equations applicable thereto. From these corrected values, a particular correction value allocated to this value range is then selected as a function of the value range in which the value of the image signal is actually located at a predetermined instant of time. For each image cell, therefore, the same number of correction values as there are value ranges has to be determined.

However, it is preferred if the determination of the corrected value according to step b) comprises the following steps:

b1) selecting correction coefficients from a number of sets of correction coefficients as a function of the result according to step a); and b2) calculating the corrected value for the image signal by using the correction coefficients.

This procedure has the advantage that the calculation of only a single corrected value is required in each case, namely by using the correction coefficients which are allocated to the value range. Rather than selecting a correction value from a number of precalculated correction values, only one correction value is calculated by using selected correction coefficients in this procedure.

It is generally possible that the correction coefficients allocated to the at least two value ranges are identical for all image cells. This already results in a considerably reduction of the FPN compared to the FPN correction during conventional white balance.

However, it is particularly preferred if the sets of correction coefficients are different for a number of image cells and/or for the different value ranges.

In this context, a number of image cells might be combined in groups. Preferably, however, individual correction coefficients are used for each image cell.

This measure makes it possible to achieve a further considerable improvement in the FPN correction since now correction coefficients adapted to the individual characteristic of the image cell are available for each individual image cell. Nevertheless, the total number of coefficients needed can be kept within reasonable limits since the transformation equations are simplified due to the subdivision into a plurality of value ranges. The number of coefficients required depends on the type of approximation used. It is preferred if the sections of the characteristic curves are approximated by linear, quadratic or cubic equations.

In principle, the at least two value ranges can be identical for all image cells. This greatly simplifies the circuit configuration required for carrying out the method since it is not necessary to read out one or more separate threshold values for each image cell and to supply these to a discriminator.

Preferably, however, the at least two value ranges are different for a number of image cells.

Although this requires the additional storage of threshold values for each image cell, this disadvantage is balanced by the fact that a further considerable improvement in the FPN correction is achieved. This is related to the fact that the characteristic curve of an image cell can be approximated well by simple approximation characteristics within the at least two value ranges when the transition between the value ranges, i.e. the threshold value or values are individually matched to the characteristic curves.

The threshold values for the image elements can be stored, for example, in a threshold memory. It is also possible to calculate the threshold values from stored coefficients for the transformation equations so that no additional memory capacity has to be provided for the threshold values. Individual coefficients might also directly be used as threshold values.

Depending on the type of characteristic curves, it may be necessary to approximate the corresponding sections of the characteristic curve by different approximation characteristics within the at least two value ranges. It is particularly preferred if the overall characteristic curve for an image element is approximated by an approximation characteristic using a section of a parabola in the first two brightness decades, i.e. at lower light intensities, and by a straight characteristic above that. This is because, in this case, only three correction coefficients are sufficient for each image element. Moreover, a steady and "soft" transition is obtained between the sections of characteristic curves of the individual value ranges.

It is advantageous if the correction is carried out for all image cells by means of transformation equations which only differ due to different coefficients.

In this manner, the transformations can be performed for all image cells with the aid of a suitable arrangement of logic elements which only have to be supplied with different coefficients for each image cell.

In an advantageous embodiment of the invention, the transformation equations are established by an arrangement of logic elements, particularly of adders and multipliers which are supplied with the coefficients from a memory.

It is also preferred if the correction coefficients are determined for each image cell from a comparison of an actual characteristic which specifies the relationship between an optical intensity impinging on the respective image cell and the image signal generated, and a nominal characteristic.

In principle, the nominal characteristic can be arbitrarily specified. However, it should be specified from the point of view that, with regard to the approximation equations for the actual characteristics, the simplest possible transformation equations are obtained within the value ranges.

It is then preferred if the nominal characteristic is determined by computing the mean value from the actual characteristics of the image cells.

Due to this specification of the nominal characteristic, the corrections to be performed on the individual image signals become minimal overall.

In the case of particular image sensors such as are known, for example, from EP 632 930 B1, a high dynamic range of the input signal is logarithmically compressed to a much smaller dynamic range of the output signal. Thus, each image cell of these image sensors generates an output voltage which corresponds to the logarithm of the optical intensity impinging on it. In this manner, the extremely wide dynamic range of natural scenes which is of the order of magnitude of 120 dB can be covered well by signal processing means. The logarithmic compression is effected by electronic components which are part of each individual image cell. It has been found that particularly good results can be achieved in such image sensors by using the novel FPN correction method. This is because the characteristic curves of such image cells can be easily subdivided into two value ranges within which they are in each case approximately linear with respect to the logarithm of the brightness information.

For this reason, it is preferred if, with approximately logarithmic actual characteristic curves of the image cells, the at least two value ranges are specified such that within the value ranges, the actual characteristics and the nominal characteristic each are approximately linear with respect to the logarithm of the optical intensity.

It is also preferred if, for each image cell and for each of the at least two value ranges, the corrected value $V_c$ is determined for the image signal from an actual value $V_r$, generated from the image cell, in accordance with a transformation equation of the following form $$V_c = a \cdot V_r + b$$

where a and b are correction coefficients of the transformation equation that are determined from a comparison of the actual characteristic with the nominal characteristic.

Such a linear transformation equation is obtained if the individual sections of the characteristic curve are approximated by straight lines. The circuit for such a linear transformation equation can be achieved by a simple series circuit of a multiplier and an adder, and the order of these two logic elements is of no importance, in principle.

In an improvement of this embodiment, the correction coefficients a and b are $$a = \frac{a_i}{a_r} \text{ and } b = b_i - \frac{a_i}{a_r} b_r$$

for the nominal characteristic in the corresponding value range being approximated by the equation $$V_i = a_i \cdot \log E + b_i$$

and the actual characteristic being approximated by the equation $$V_r = a_r \cdot \log E + b_r,$$

where E is a measure of the optical intensity impinging on the relevant image cell.

In each value range, the image signals of the individual image cells, which are linear with respect to the logarithm of the brightness information, are described by linear approximation equations, the coefficients of which produce the coefficients of the transformation equation by means of the relation specified. These coefficients are stored in a memory and called up whenever the image signal of the relevant image cell is located within the associated value range.

The coefficients $a_r$ and $b_r$ are preferably determined from actual characteristics of the image cells by the method of minimum square errors.

Since only individual test points are available for the recording of the actual characteristics at the manufacturer's side, this method provides a particularly simple and accurate approach for determining the coefficients of the linear approximation equations.

The coefficients $a_i$ and $b_i$ are preferably determined by computing the mean value from the coefficients $a_r$ and $b_r$ over all image cells.

This makes it possible to determine an approximation equation for the nominal characteristic in the individual value ranges in a particularly simple manner.

BRIEF DESCRIPTION OF THE DRAWINGS

Further advantages and features of the invention are obtained from the description of the following exemplary embodiments, referring to the drawing in which.

DETAILED DESCRIPTION OF PREFERRED EMBODIMENTS

Figure 1:
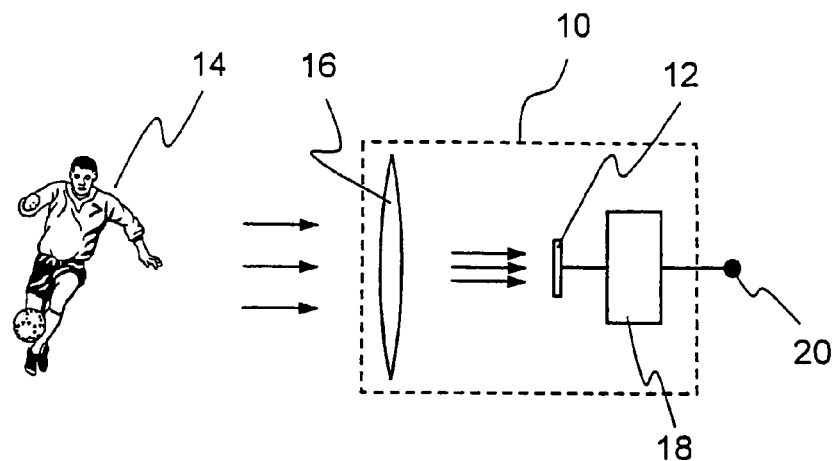
FIG. 1 shows a highly diagrammatic representation of a digital camera according to the invention with an image sensor installed therein.

FIG. 1 shows in a greatly simplified diagrammatic representation a digital camera 10 which can be a photographic camera or a film camera. The digital camera 10 has an electronic image sensor 12, on the light-sensitive surface of which a motive 14 is imaged with the aid of a lens system 16, only schematically shown in this case. The images recorded by the image sensor 12 are digitally processed in an electronics unit 18 so that they can be finally read out via a camera output 20. The electronics unit 18 can be associated with an image memory, not shown in FIG. 1, in which the processed images can be stored. It is also possible to arrange only part of the electronics unit 18 within the digital camera 10. The remaining parts are then implemented outside the digital camera 10, e.g. as software which can be executed on a personal computer.

Figure 2:
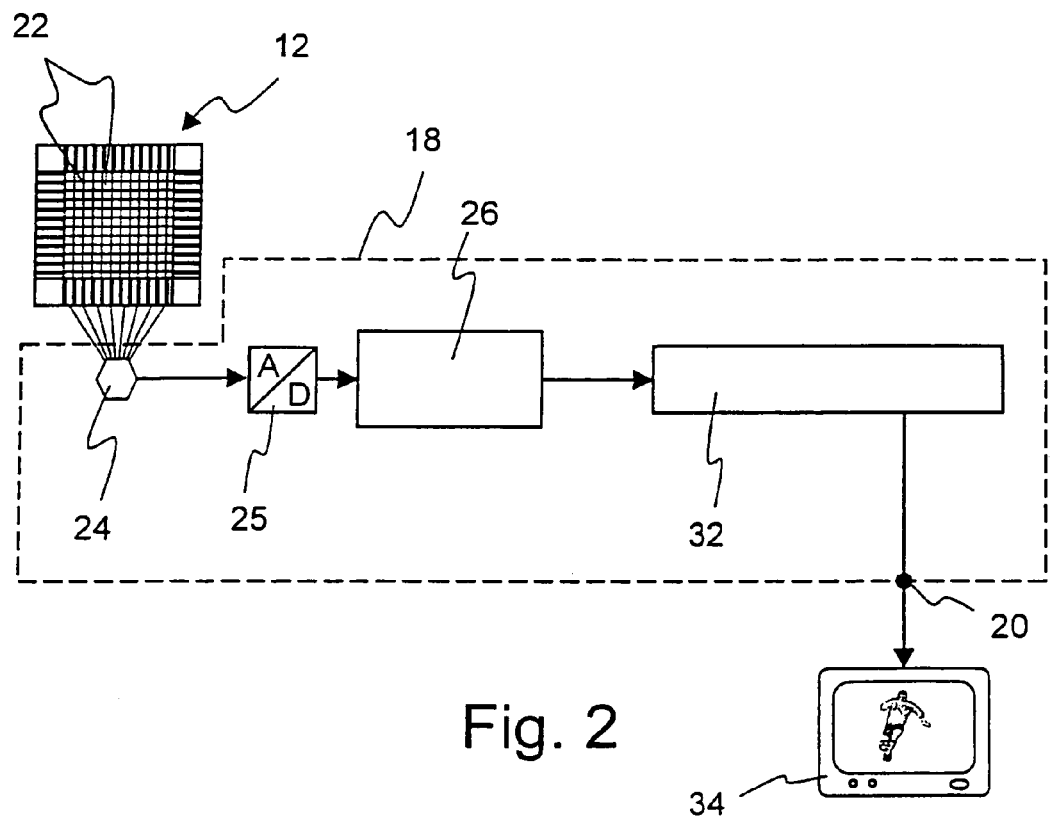
FIG. 2 shows a basic circuit diagram of an electronic unit for processing image signals which are generated by the image sensor shown in FIG. 1.

FIG. 2 shows the image sensor 12 and the electronics unit 18 in further detail. The image sensor 12 comprises a regular arrangement of image elements which each consist of three light-sensitive image cells 22 in a manner known per se. Each image cell 22 of an image element is covered by different color filters so that the output voltage generated by the respective image cell is a function of the intensity of the light of that spectral color which can pass through the relevant filter. In the case of image sensors suitable only for black/white recordings, the image elements each consist of only a single image cell. The image cells 22 used in the image sensor 12 are implemented as circuits of semiconductor components which, in the exemplary embodiment shown, generate an output voltage which approximately corresponds to the logarithm of the optical intensity impinging thereon. The image cells 22, therefore, generate logarithmically compressed image signals. Details of the structure of such image cells 22 can be found in the aforementioned EP 632 930 B1.

The image signals generated by the image cells 22 are read out line by line and column by column and assembled in a readout multiplexer 24 to form a total signal. The total signal thus contains the image signals associated with the individual image cells 22 in sequence in time. In the text which follows, statements regarding image signals will, therefore, always refer to the image signal which is generated by a quite particular image cell 22 in the image sensor 12.

The image signals are digitized in an analog/digital converter 25, which can also be arranged on the image sensor 12 itself, and are then corrected in an FPN correction unit 26 such that the corruption in the recorded image caused by the FPN is largely reduced. The configuration of the FPN correction unit 26 will still be explained in greater detail below by means of a number of exemplary embodiments.

The FPN-corrected image signal is then processed further in a processing stage 32, in order to selectively change the brightness or color saturation and to perform a γ correction, for example.

The image signal thus processed can finally be read out via the output 20 and converted back into an image by means of an output device 34.

Figure 3:
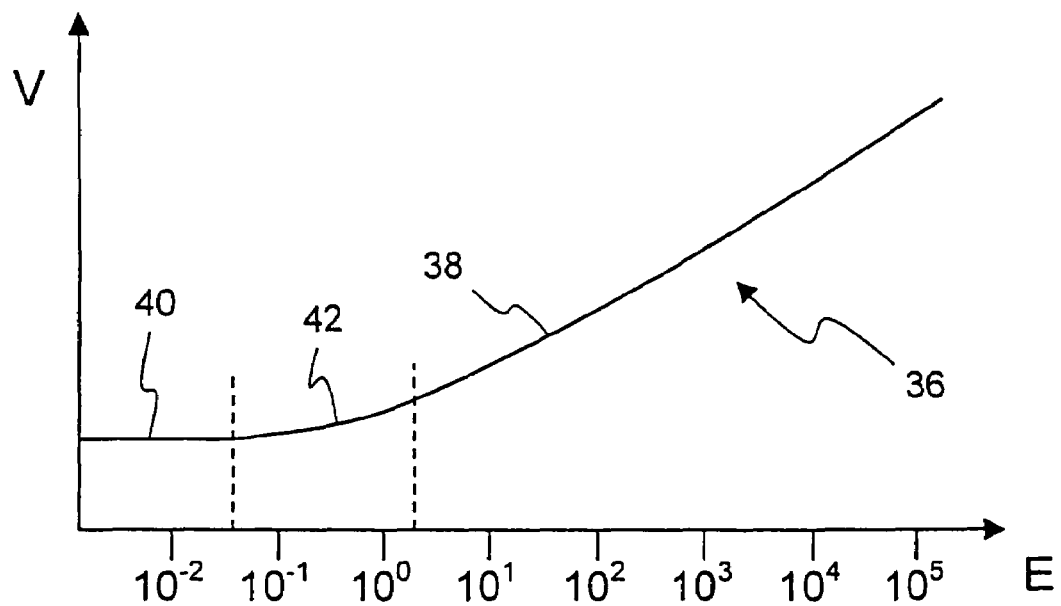
FIG. 3 shows the representation of a characteristic curve of an individual image cell with logarithmic compression, in which an output voltage is plotted against an optical intensity impinging on the image cell.

FIG. 3 shows a characteristic curve 36 of an individual image cell 22 in a representation in which an output voltage V generated by the image cell 22 is plotted against a brightness E impinging on the image cell 22. In the selected semilogarithmic representation in which the abscissa is logarithmically subdivided, it can be seen that the characteristic curve 36 has a first and a second section 38 and 40, respectively, in which the output voltage V is approximately linear with respect to the logarithm of the brightness E. At higher brightnesses (first section 38), the output signal V of the image cell 22 increases logarithmically with the brightness E. For very low brightnesses (second section 40), the output voltage V of the image cell 22 is approximately independent of the brightness E. This approximately horizontal section of the characteristic curve 36 represents a dark current of the image cell 22 which is essentially attributable to the photodiode contained in the image cell. The dark current is produced there by, among other things, thermal generation and recombination of free charge carriers via the impurities existing in the space charge region of the photodiode. Between the first section 38 and the second section 40, a transition section 42 is located in which the characteristic curve 36 is curved.

The characteristic curve 36 of an image cell 22, shown in FIG. 3, can be mathematically represented by an equation of the following form:

$$V = k \cdot \log(\alpha E + I_D) + c \quad (1)$$

where $I_D$ is the dark current and c is a variable dependent on the temperature and the transistor geometry. The factor α reproduces the relationship between the current intensity generated by the image cell 22 and the brightness E.

Figure 4:
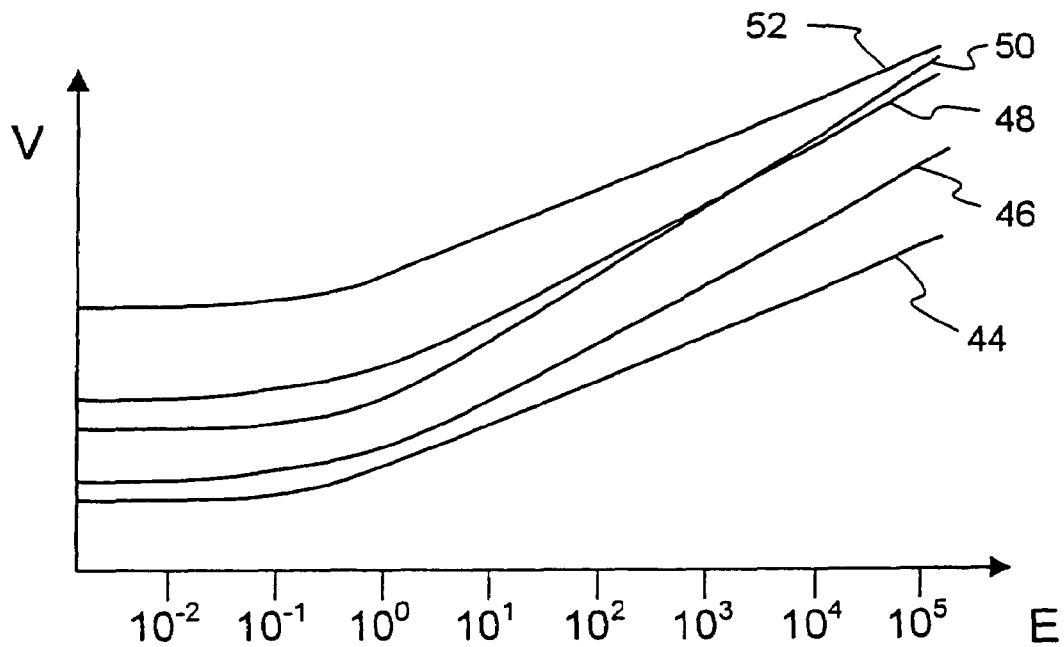
FIG. 4 shows a representation of the characteristic curves of a number of image cells of an image sensor.

FIG. 4 shows a representation, corresponding to FIG. 3, of a number of characteristic curves 44, 46, 48, 50 and 52 which are associated with different image cells 22 of the image sensor 12. In this representation, it can be seen that the characteristic curves of the individual image cells differ not only with regard to their dark currents but also with regard to the factors α which specify the slope of the characteristic curves at higher brightnesses. Due to these relatively large differences between the individual characteristics, an addition or subtraction of constant values as is the case with conventional white balance will not lead to largely corresponding characteristic curves.

Figure 5:
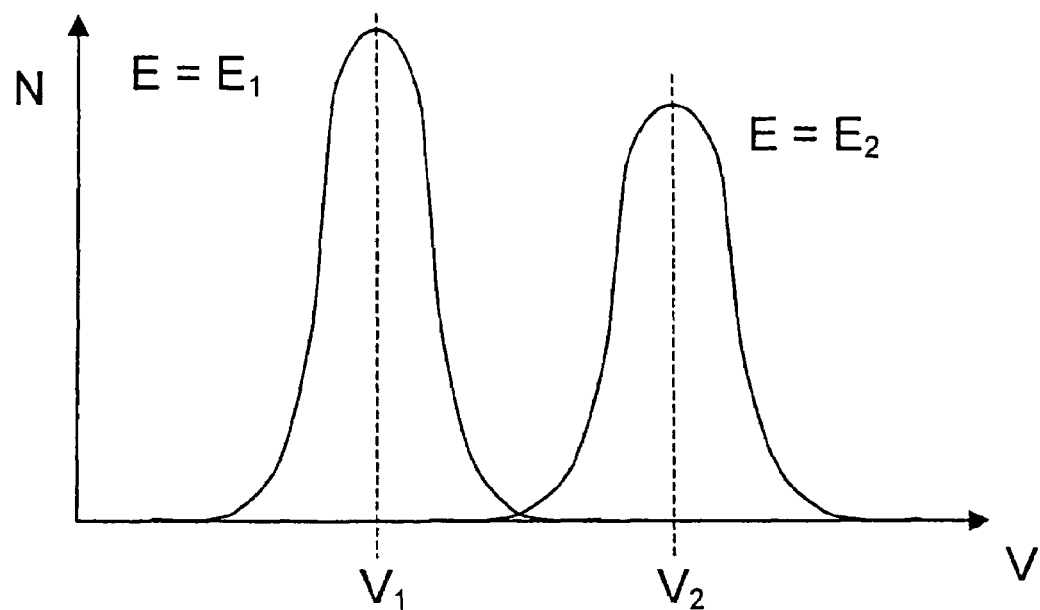
FIG. 5 shows a representation of the distribution of output voltages generated by a number of image cells for two different brightness values.

In FIG. 5, the distribution (number N) of the output voltages V is indicated for two fixed brightnesses $E_1$ and $E_2$ and for the case that not only five but several hundred thousand characteristics corresponding to the individual image cells of the image sensor 12 are plotted in FIG. 4. The spreads of the output voltages about the mean values $V_1$ and $V_2$, respectively, measured for the individual image cells, are a measure of the severity of the FPN. The wider these distribution curves are, the more severe is the FPN and the grainier is the appearance of an area which is homogeneous per se on a screen or on a printout. FIG. 5 also shows that the FPN effect itself depends on the brightness.

Figure 6:
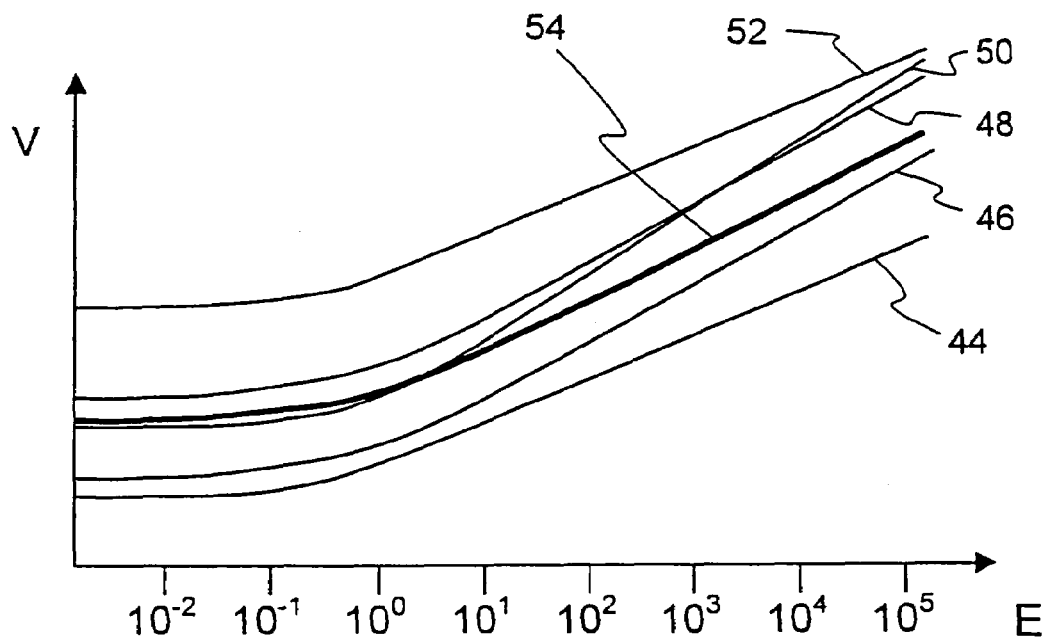
FIG. 6 shows a representation, corresponding to FIG. 4, of a number of characteristic curves in which a nominal characteristic is additionally plotted.

In FIG. 6, a nominal characteristic 54 which is determined by averaging the actual characteristics 44 to 52 is plotted for the five characteristic curves 44 to 52 from FIG. 4. The mean values $V_1$ and $V_2$ from FIG. 5 are thus located on the nominal characteristic curve 54.

The FPN would disappear completely if it were possible to map the actual characteristics 44 to 52 onto the nominal characteristic 54 (or another arbitrarily specified nominal characteristic) by means of a suitable transform. However, a transform of the equation (1) is mathematically very complex and, therefore, cannot be handled by an FPN correction unit in real time.

Figure 7:
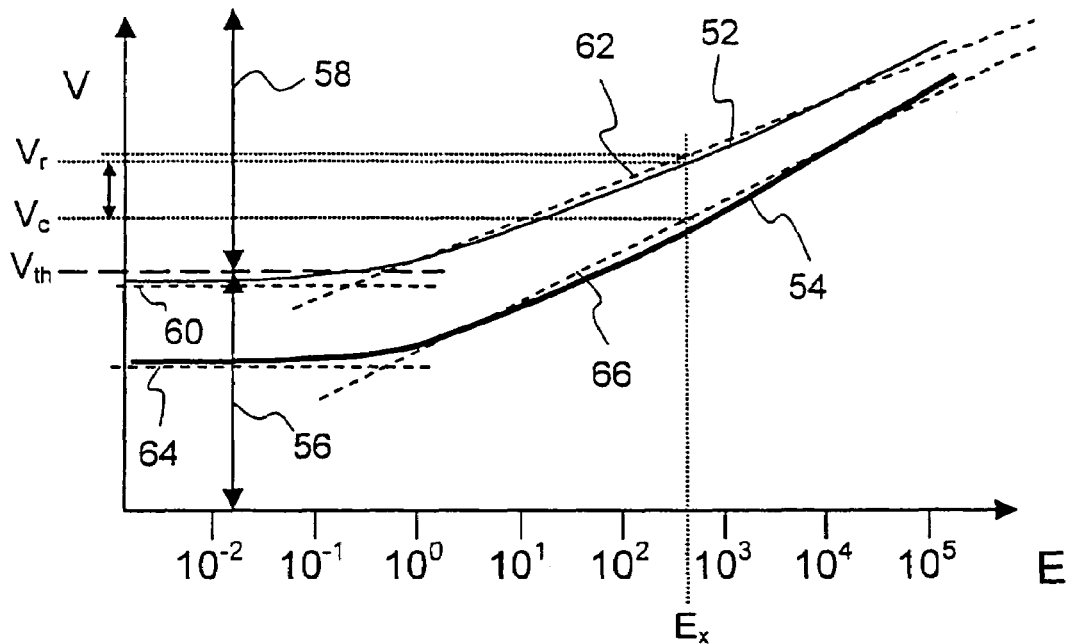
FIG. 7 shows a representation of a nominal characteristic and of an actual characteristic in a representation as in FIG. 6, in which additional approximation lines are shown for individual value ranges.

To solve this problem, the ordinate is then subdivided, as shown in FIG. 7, into a first and a second value range 56 and 58, respectively, by specifying a suitable threshold value $V_{th}$ for the output voltage. In the first value range 56, the first section attributable to the dark current is approximated by an approximately horizontal first approximation line 60 for the actual characteristic 52. In the second value range 58, the characteristic curve 52 is approximated by a second approximation line 62, which is now sloped. The threshold value $V_{th}$ is selected such that the actual characteristic curve 52 overall is approximated as well as possible by the two approximation lines 60 and 62.

For the second value range 58, the approximation line 62 can be described via an equation of the following form $$V = a_r \cdot \log E + b_r \quad (2)$$

where $V_r$ is an output voltage of the actual characteristic curve and $a_r$ and $b_r$ are the coefficients of the linear equation (2).

The two coefficients $a_r$ and $b_r$ can be determined by the method of minimum square errors (regression analysis) in a manner known per se. For this purpose, the manufacturer records a multiplicity of measurement values once for each image cell over the entire brightness range, from which values of the two coefficients $a_r$ and $b_r$ are determined according to the method of minimum square errors within the second value range 58.

Just like the coefficients of the second approximation line 62, the coefficients of the first approximation line 60 are also determined for all image cells of the image sensor 12. The characteristic curve of each image cell is thus represented in approximation in each case by a total of four coefficients.

In order to enable the actual image signals to be transformed, first a nominal characteristic 54 is then determined. This can be done, for example, by first averaging the measurement values recorded for each image cell at a certain brightness thereby determining a mean value for this brightness. Using these mean values, an approximation by a first and a second nominal approximation line 64 and 66, respectively, can then be carried out, also by way of the method of minimum square errors. Preferably, however, the four coefficients of the two nominal approximation lines 64 and 66 are determined directly by averaging from the coefficients determined for each individual image cell. In other words, for the second approximation line 66, for example, it is $$V_i = a_i \log E + b_i \quad (3)$$

with $$a_i = \frac{1}{n}\sum_{k=1}^{n} a_{rk},\ b_i = \frac{1}{n}\sum_{k=1}^{n} b_{rk}, \quad (4)$$

where $V_i$ is the output voltage of the nominal characteristic 54, $a_i$ and $b_i$ are the coefficients of the second nominal approximation lines 66 and $a_{rk}$ and $b_{rk}$ are the measurement values recorded for each image element in the second value range 58. n is the number of image cells of which characteristic curves have been recorded. Corresponding equations also apply to the first nominal approximation line 64 of the first value range 56.

The threshold value $V_{th}$ which separates the two value ranges 56 and 58 from one another can be preferably specified independently for each of the image cells 22. Otherwise, the approximately horizontal sections of the characteristic curves would partially still be approximated by the equations for the sloping sections and conversely as can be easily seen from FIG. 6.

Figure 8:
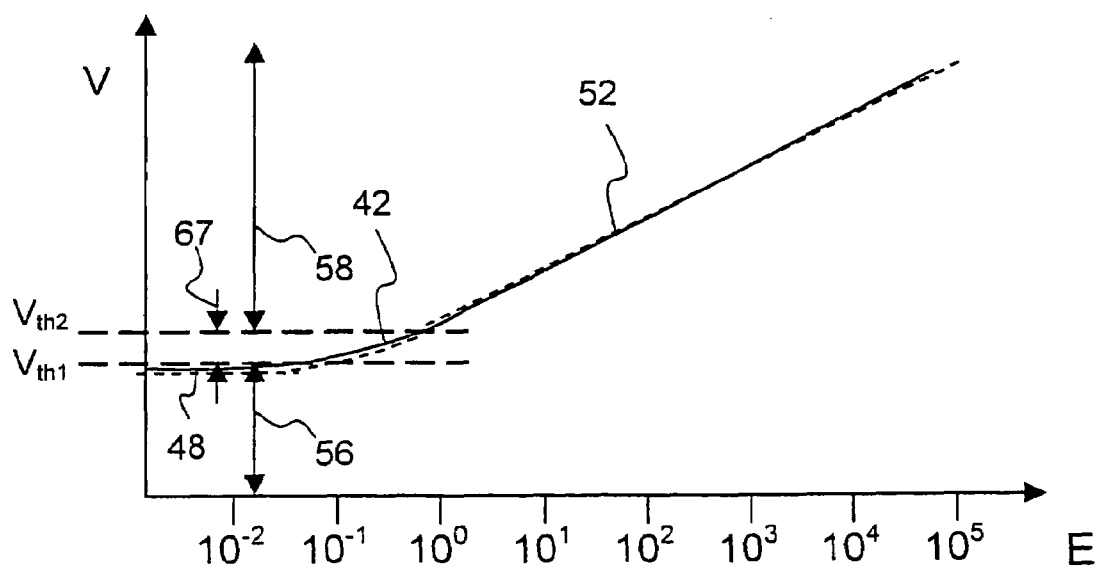
FIG. 8 shows a representation of an actual characteristic with a subdivision into three value ranges.

A further improvement in the approximation can be achieved by subdividing the ordinate not into two but into three or even more value ranges. In FIG. 8, a third value range 67 is inserted between the first value range 56 and the second value range 58 for the characteristic curve 52, which approximates the transition section 42 of the characteristic 52 by means of a quadratic function of the following form $$V_r = p(\log E - E_o)^2 + p_o \quad (5)$$

where p, $E_0$ and $p_0$ are coefficients of the parabolic equation (5). However, not only four but a total of seven coefficients are to be stored for each image cell in the FPN correction unit 26.

In a particularly preferred exemplary embodiment, the desired nominal characteristic is approximated by a section of a parabola as approximation characteristic in a first value range and by a straight line in a second value range. When the first value range exactly covers the first two brightness decades, a steady and particularly "soft" transition between the sections of the characteristic curve is obtained. In addition, the number of required correction coefficients can be reduced to a total of three per image cell in this case and the transformation of the real values of the image elements to the approximation characteristic is simple and can be carried out in real time.

Eliminating the log E term from equations (2) and (3) makes it possible to derive the linear transformation equation $$V_c = a \cdot V_r + b \quad (6)$$

for the example shown in FIG. 7, where $V_c$ is the corrected output voltage and a and b are the coefficients of the transformation equation (6). The coefficients a and b are derived from the coefficients $a_r$, $b_r$, $a_i$ and $b_i$ of approximation equations (2) and (3) by the relation $$a = \frac{a_1}{a_r} \text{ and } b = b_i - \frac{a_i}{a_r} \cdot b_r \quad (7)$$

Corresponding equations (6) and (7) also apply to the first value range 56.

Thus, two transformation equations (6) with two coefficients each are required for each image cell in order to transform actual output voltages $V_r$ into corrected voltage values $V_c$ in such a manner that the corrected output voltages $V_c$ approximately correspond with a given brightness $E_x$ for all image cells.

It goes without saying that the FPN correction described above can also be carried out for only some of the image cells of an image sensor, if desired.

Figure 9:
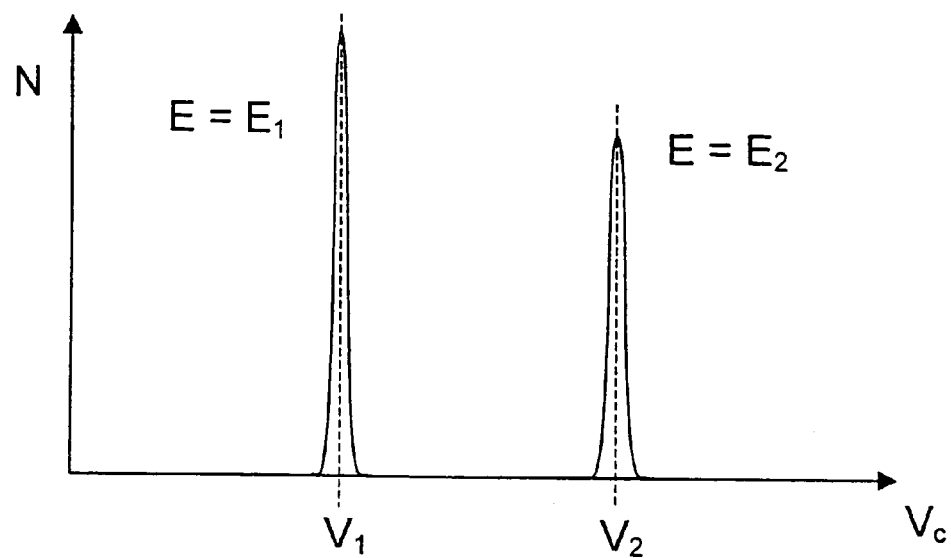
FIG. 9 shows a representation, corresponding to FIG. 5, of the distribution of the output voltages subjected to the FPN correction according to the invention.

FIG. 9 shows the distribution of the corrected output voltages $V_c$ for the two brightnesses $E_1$ and $E_2$. As can be seen clearly from a comparison with FIG. 5, the spread of the corrected output voltages about the mean values $V_1$ and $V_2$, respectively, is much less than in the case of uncorrected output voltages V. The FPN is thus also correspondingly low so that the graininess of areas, which are homogeneous per se, is reduced considerably and under certain circumstances to below the threshold of perception.

Figure 10A:
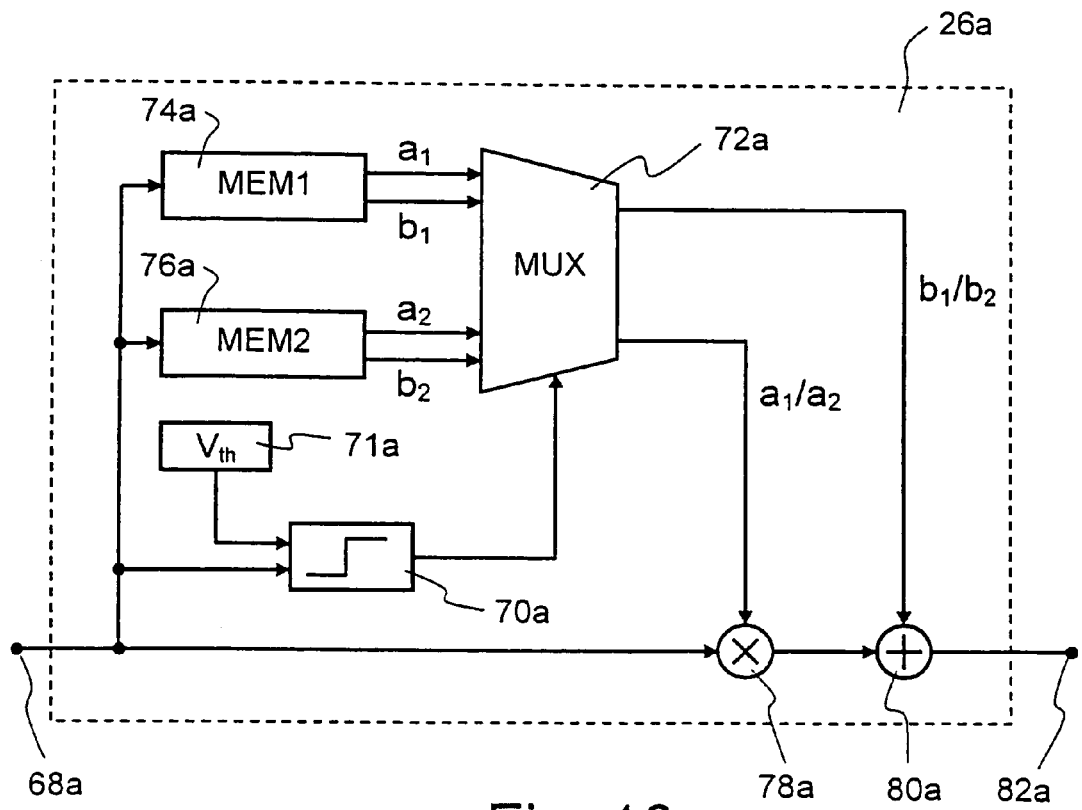
FIGS. 10a-10f show exemplary embodiments of a device according to the invention for the FPN correction in a diagrammatic representation.

FIG. 10a shows a diagrammatic representation of a first exemplary embodiment 26a of the configuration of an FPN correction unit 26. The image signal of a particular image cell, supplied at an input 68a, is supplied to a discriminator 70a which checks whether the image signal is above or below the threshold value $V_{th}$ stored in a threshold memory 71a. In this exemplary embodiment, the threshold value $V_{th}$ is identical for all image cells. The result of this check is transferred to a multiplexer 72a. By means of the multiplexer 72a, values can be read out of a first memory 74a and a second memory 76a which can be supplied in each case with the address of the image cell whose output voltage is currently present in digital form at input 68a. In the first memory 74a, coefficients $a_1$ and $b_1$ of the transformation equation (6) for the first value range 56 for all image cells of the image sensor 12 are stored. In the second memory 76, coefficients $a_2$ and $b_2$ of the transformation equation (6) for the second value range 58 are stored.

The multiplexer 72a then reads out the coefficients of the transformation equation belonging to the selected value range from one of the two memories 74a or 76a as a function of the result transferred from the discriminator 70a. The coefficients $a_1$ or $a_2$ are supplied to a multiplier 78a in which the image signal present at the input 68a is multiplied by the factor $a_1$ or $a_2$ supplied. The coefficients $b_1$ or $b_2$ are supplied to an adder 80a as a function of the value range selected and are added to the image signal altered in the multiplier 78a. The corrected image signal can be picked up at an output 82a of the FPN correction unit 26a.

It goes without saying that the two memories 74a and 76a and the threshold memory 71a can also be implemented as separate memory areas in a common memory element.

Depending on the chip technology used, the access time for the two memories 74a and 76a, and the read-out frequency, it may also be appropriate to implement the FPN correction unit 26a as a pipeline structure into the data paths of which registers are inserted.

If more than two value ranges are provided, the number of value ranges which can be distinguished by the discriminator 70a must be correspondingly adapted by providing further threshold values. In addition, additional memories must be provided from which coefficients can be read out by the multiplexer 72a. If the transformation equation (6) is not a linear equation but has another form, this can be taken into consideration by a different arrangement of the logic elements (multiplier 78a and adder 80a).

Figure 10B:
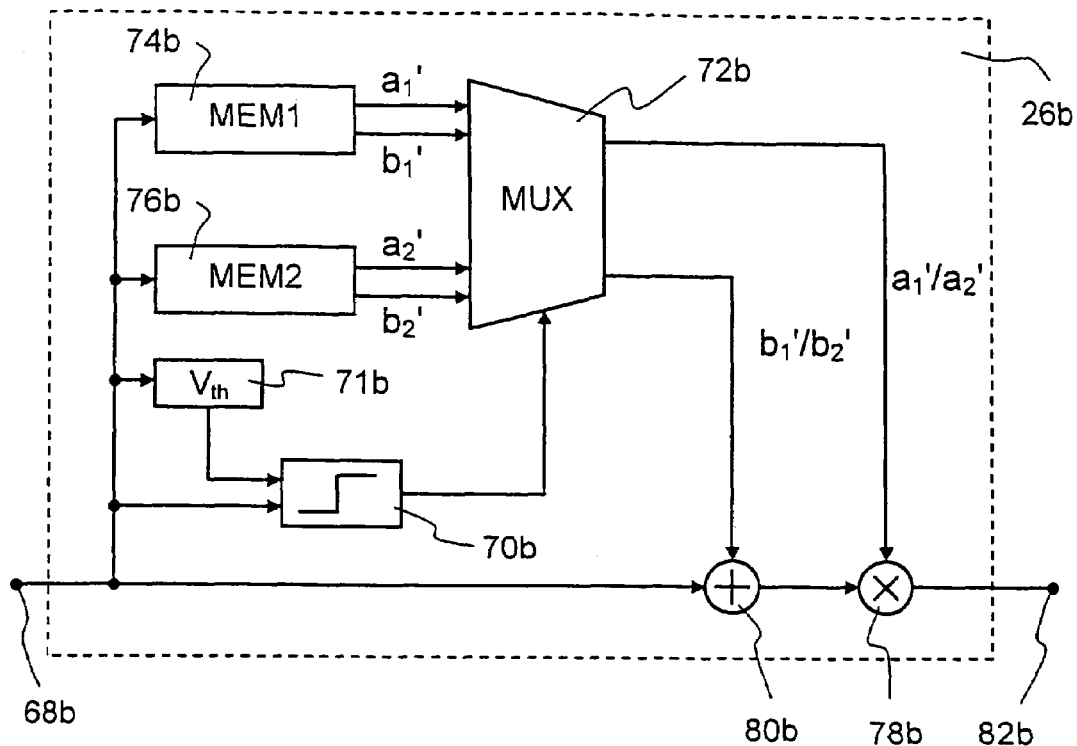

In the FPN correction unit 26b shown in FIG. 10b, a common threshold value $V_{th}$ is not provided for all image cells as is the case in the FPN correction unit 26a from FIG. 10a. Rather, a separate threshold value $V_{th}$ for each image cell is stored in a threshold memory 71b. As already mentioned above, this considerably improves the accuracy of the FPN correction. For this purpose, the threshold memory 71b is connected to an input 68b of the FPN correction unit 26b so that it can be supplied with the address of the image cell whose output voltage is currently present at the input 68b.

The FPN correction unit 26b shown in FIG. 10b also differs from the FPN correction unit 26a shown in FIG. 10a in that an adder 80b and a multiplier 78b are interconnected in the reverse order. In this manner, the calculation does not take place in accordance with equation (6) but in accordance with an equation of the following form $$V_c = a'(V_r + b') \quad (8)$$

where the coefficients a' and b' can be derived from a and b.

Figure 10C:
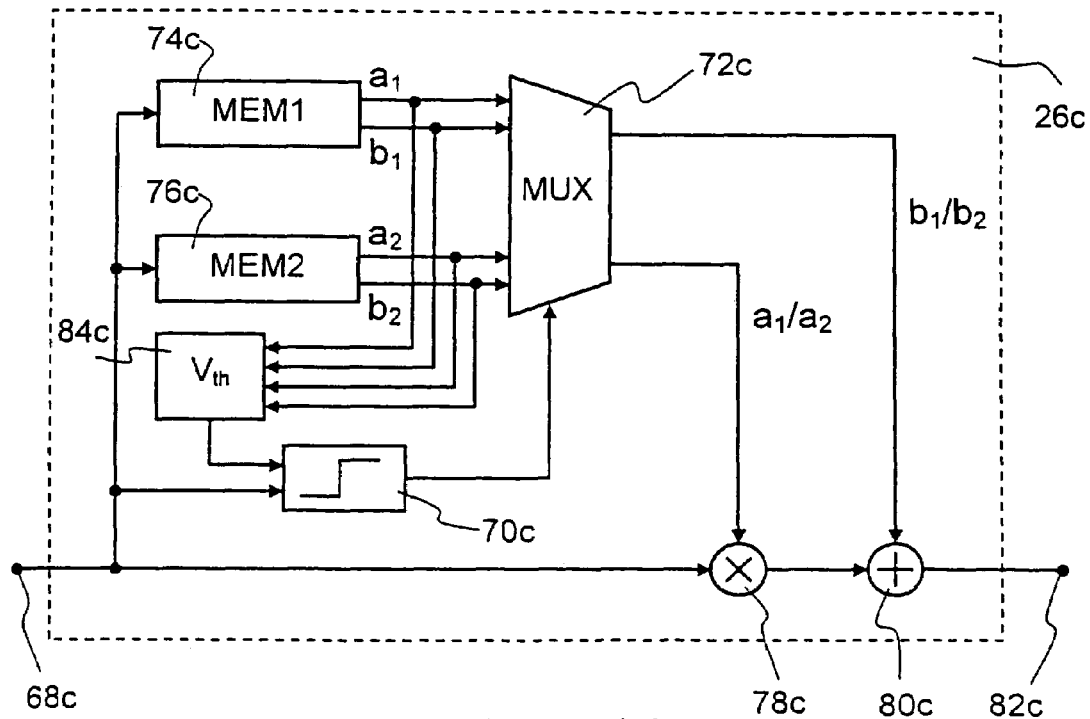

The FPN correction unit 26c shown in FIG. 10c provides, instead of a threshold memory, a threshold value calculating unit 84c which determines a threshold value independently for each image cell by using the coefficients supplied from memories 74c and 76c, and a discriminator 70c. Such a calculation is appropriate, for example, if the costs for the storage space to be provided for a threshold memory are greater than the costs for the threshold value calculating unit 84c.

Figure 10D:
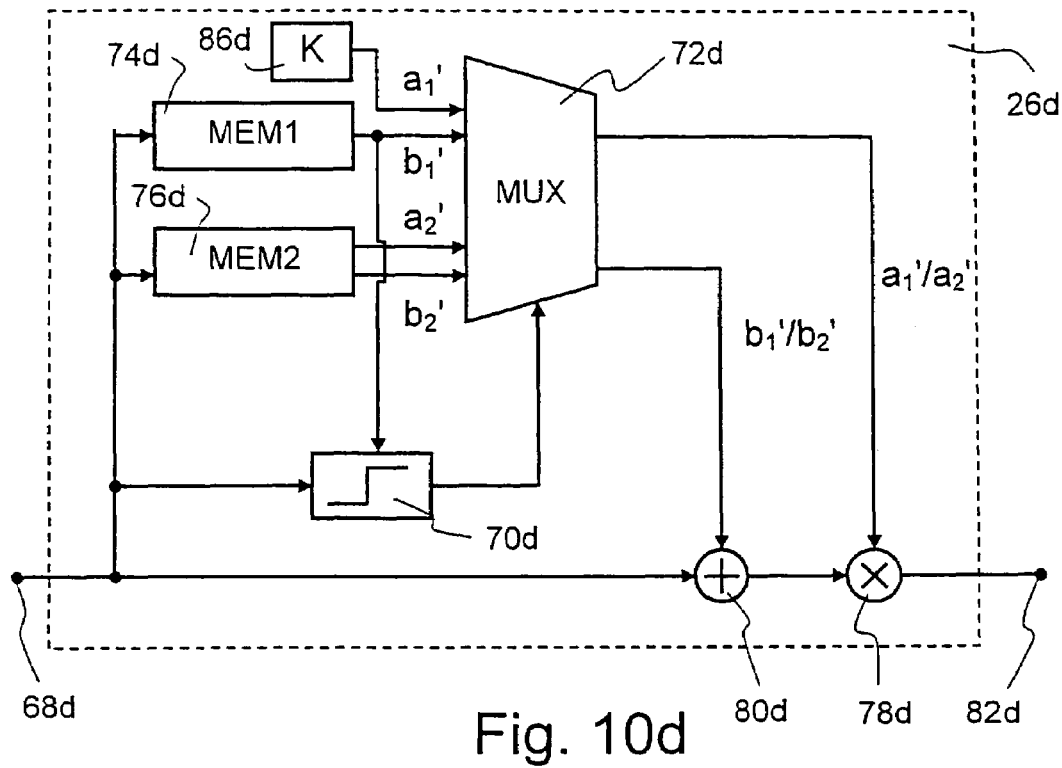

The FPN correction unit 26d shown in FIG. 10d differs from the FPN correction unit 26b shown in FIG. 10b in that the coefficient $a_1'$, which is calculated from the slope of the approximately horizontal (nominal) approximation line 60 and 64, respectively, is equal for all image cells in the first value range and, therefore, is not loaded from a memory 74d but from a read-only memory 86d which may also be contained in a multiplexer 72d or replaced by circuit wiring. In addition, the coefficient $b_1'$ is supplied as threshold value to a discriminator 70b so that a threshold memory can also be omitted in this case.

Figure 10E:
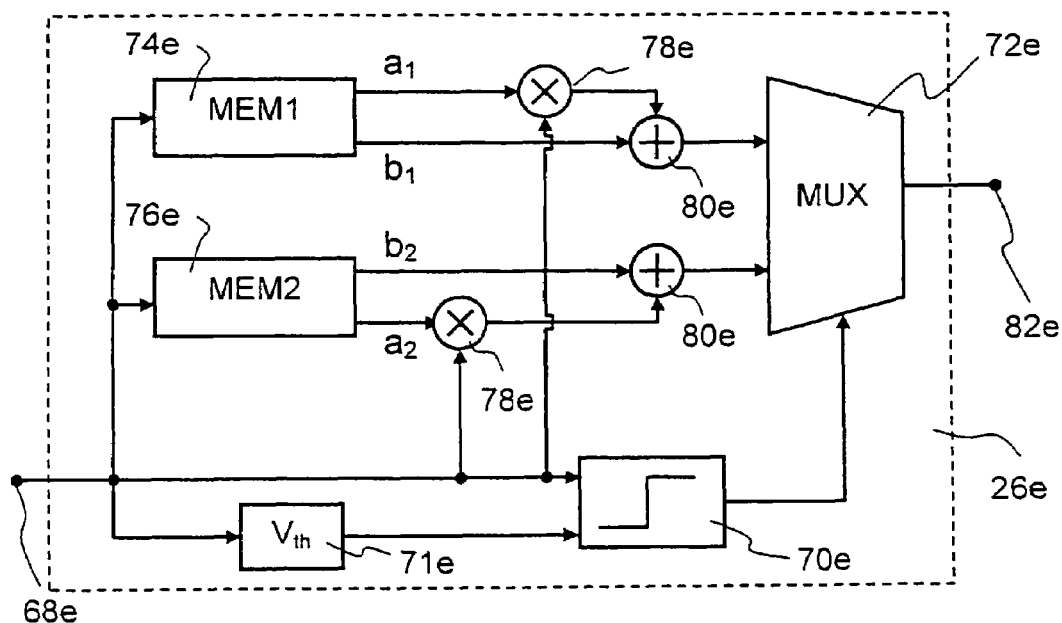

In the FPN correction unit 26e shown in FIG. 10e, there is not first a selection of coefficients for the individual value ranges followed by a calculation of the correction values $V_c$ as is the case in the exemplary embodiments described above. Instead, in the FPN correction unit 26e, correction values which can be picked up following the adders 78a are calculated in parallel for both value ranges. From the two correction values calculated, one correction value is then selected in a multiplexer 72e and provided to an output 82e. Here, too, the multiplexer 72e is driven by a discriminator 70e which checks whether the image signal is above or below the threshold value $V_{th}$ stored in a threshold memory 71e.

Figure 10F:
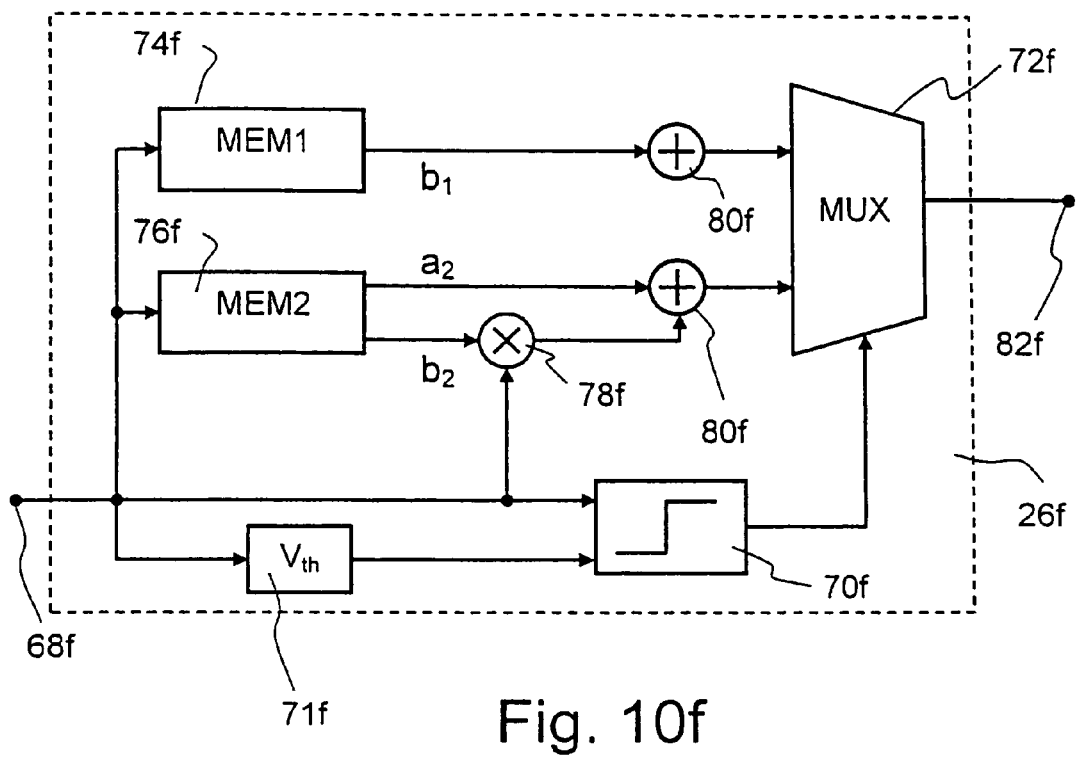

The FPN correction unit 26f shown in FIG. 10f only differs from the FPN correction unit 26e described above in that the coefficient $a_1$ is equal to zero for all image cells which corresponds to horizontal (nominal) approximation lines in the first value range. As a result, one of the multipliers required in the FPN correction unit 26e according to FIG. 10e can be dispensed with. It goes without saying that in the FPN correction units 26e and 26f, too, the threshold values can also be determined from the stored coefficients as has been described above with respect to the FPN correction unit 26c.

The individual components of the FPN correction units 26a to 26f described above can be constructed of digital or also analog components (multipliers 78, adders 80 and multiplexers 72). In the case of an analog construction, obviously, the analog/digital converter 25 at the input can be dispensed with. In addition, the coefficients stored in memories 74 and 76 must be converted into analog signals with the aid of digital/analog converters.

What is claimed is:

1. A method for fixed-pattern noise correction of image signals generated by image cells of an image sensor, comprising the following steps,
  a) determining in which value range out of at least two value ranges a value of an image signal is located at a predetermined instant of time; and
  b) determining a corrected value for the image signal as a function of the result according to step a), wherein the step of determining the corrected value according to step b) comprises the substeps of
  b1) selecting correction coefficients from a plurality of sets of correction coefficients as a function of the result according to step a); and
  b2) calculating the corrected value for the image signal by using the selected correction coefficients,
  wherein said correction coefficients are determined from a comparison of an actual characteristic, which specifies a relationship between an optical intensity impinging on the respective image cell and the image signal generated, with a nominal characteristic, for each image cell,
  wherein the at least two value ranges are specified such that the actual characteristics and the nominal characteristic each are approximately linear with respect to the logarithm of the optical intensity impinging on the image cells within the respective value ranges, and further
  wherein, for each image cell and for each of the at least two value ranges, the corrected value for the image signal is determined from an actual value generated by the image cell based on a transformation equation of the following form $$V_c = (a \cdot V_r) + b$$

where $V_c$ is the corrected value for the image signal, a and b are correction coefficients of the transformation equation that are determined from a comparison of the actual characteristic and the nominal characteristic, and $V_r$ is the actual value generated by the image cell.

2. The method of claim 1, wherein steps a) and b) are carried out separately for the image signal of each image cell.

3. The method of claim 1, wherein the sets of correction coefficients are individual for a plurality of image cells.

4. The method of claim 1, wherein an individual set of correction coefficients is used for each value range.

5. The method of claim 1, wherein the at least two value ranges are different for a plurality of image cells.

6. The method of claim 1, wherein the step of calculating according to substep b2) is executed for all image cells by means of transformation equations which only differ due to different correction coefficients selected.

7. The method of claim 6, wherein the transformation equations are specified by an arrangement of logic elements which are supplied with the correction coefficients from a memory.

8. The method of claim 7, wherein the logic elements comprise an arrangement of adders and multipliers.

9. The method of claim 1, wherein the nominal characteristic is determined by computing a mean value from the actual characteristics of the image cells.

10. The method of claim 1, wherein the correction coefficients a and b are $$a = \frac{a_i}{a_r} \text{ and } b = b_i - \left(\frac{a_i}{a_r} b_r\right)$$

for the nominal characteristic in the corresponding value range being approximated by the equation $$V_i = (a_i \cdot \log E) + b_i$$

and the actual characteristic being approximated by the equation $$V_r = (a_r \cdot \log E) + b_r$$

where E is a measure of the optical intensity impinging on the relevant image cell, $V_i$ is the output value of an image cell according to the nominal characteristic, $a_i$ and $b_i$ are coefficients of a linear approximation representing the nominal characteristic, and $a_r$ and $b_r$ are coefficients of a linear approximation representing the actual characteristic.

11. The method of claim 10, wherein the coefficients $a_r$ and $b_r$ are determined from actual characteristics of the image cells by a method of minimum square errors.

12. The method of claim 10, wherein the coefficients $a_i$ and $b_i$ are determined by computing a mean value of the coefficients $a_r$ and $b_r$ over all image cells.

13. The method of claim 1, wherein the correction coefficients transform the value of the image signal onto a predefined approximation characteristic.

14. The method of claim 13, wherein the predefined approximation characteristic is a straight line for at least one value range.

15. The method of claim 13, wherein the predefined approximation characteristic is a section of a parabola for at least one value range.

16. The method claim 13, wherein the predefined approximation characteristic is a section of a parabola for a first value range and a straight line for a second value range, the first value range covering two decades of brightness.

17. A device for the fixed-pattern noise correction of image signals generated by image cells of an image sensor, comprising:

a discriminator for determining in which value range out of at least two value ranges an instantaneous value of an image signal is located at a predetermined instant of time, a correction device for determining a corrected value for the image signal as a function of the result determined by the discriminator, wherein the correction device comprises a selector for selecting correction coefficients from a plurality of sets of correction coefficients as a function of the result determined by the discriminator, and a transformation unit for calculating the corrected value for the image signal by using the selected correction coefficients, wherein said correction coefficients are determined from a comparison of an actual characteristic, which specifies a relationship between an optical intensity impinging on the respective image cell and the image signal generated, with a nominal characteristic, for each image cell, wherein the at least two value ranges are specified such that the actual characteristics and the nominal characteristic each are approximately linear with respect to the logarithm of the optical intensity impinging on the image cells within the respective value ranges, and further wherein, for each image cell and for each of the at least two value ranges, the corrected value for the image signal is determined from an actual value generated by the image cell based on a transformation equation of the following form $$V_c = (a \cdot V_r) + b$$

where $V_c$ is the corrected value for the image signal, a and b are correction coefficients of the transformation equation that are determined from a comparison of the actual characteristic and the nominal characteristic, and $V_r$ is the actual value generated by the image cell.

18. The device of claim 17, wherein the transformation unit comprises an arrangement of logic elements and a memory adapted to store correction coefficients for supplying to the logic elements.

19. The device of claim 18, wherein the transformation unit comprises a series circuit of a multiplier and an adder.

20. The device claim 18, wherein the selector is adapted to control the supplying of the correction coefficients from the memory to the logic elements.

21. The device of claim 18, wherein the memory is adapted to be supplied with information relating to the image cell which is to be read out.

22. The device of claim 17, wherein the discriminator is connected to a threshold memory adapted to store threshold values which are individual for at least a number of image cells.

23. The device of claim 17, wherein the discriminator is connected to a threshold value calculating unit adapted to calculate threshold values from the correction coefficients supplied.

* * * * *